United States Patent [19]

Hart

[11] Patent Number: 5,277,363

[45] Date of Patent: Jan. 11, 1994

[54] ELECTRICAL SYSTEM FOR CONTROLLING THE OPERATION OF A HEAT EXCHANGER UNIT, THERMOSTAT THEREFOR AND METHODS OF MAKING THE SAME

[75] Inventor: Lee A. Hart, Holland, Mich.

[73] Assignee: Robertshaw Controls Company, Richmond, Va.

[21] Appl. No.: 949,405

[22] Filed: Sep. 22, 1992

[51] Int. Cl.$^5$ ............................................. H02J 7/00
[52] U.S. Cl. ................................. 236/46 R; 307/66; 365/229
[58] Field of Search ................. 236/46 R; 165/12; 307/66; 365/229

[56] References Cited

U.S. PATENT DOCUMENTS

| | | | |
|---|---|---|---|
| 3,948,441 | 4/1976 | Perkins et al. | 236/46 R |
| 4,431,134 | 2/1984 | Hendricks et al. | 236/46 R |
| 4,701,693 | 10/1987 | Nishimura | 307/66 X |
| 4,905,187 | 2/1990 | Beyers, Jr. | 365/229 X |
| 4,963,811 | 10/1990 | Weber | 307/66 X |
| 5,102,042 | 4/1992 | Hart | 236/78 R |
| 5,107,918 | 4/1992 | McFarlane et al. | 165/12 |
| 5,111,058 | 5/1992 | Martin | 307/66 |

OTHER PUBLICATIONS

Capacitors have been used for short-term electrical power back-up.

Primary Examiner—William E. Wayner
Attorney, Agent, or Firm—Candor, Candor & Tassone

[57] ABSTRACT

An electrical system for controlling the operation of a heat exchanger unit, thermostat therefor and methods of making the same are provided, the system having a first electrical power source, the system having an electronic control logic unit operatively interconnected to the first power source to operate the heat exchanger unit in relation to data selectively entered into the electronic control logic unit and being maintained by the electronic control logic unit as long as the electronic control logic unit is receiving electric power, the system having a second electrical power source for supplying electrical power to the electronic control logic unit to maintain the data thereof when the first electrical power source ceases to supply electrical current to the electronic control logic unit even for a relatively long period of time, the second electrical power source comprising a capacitor unit.

5 Claims, 3 Drawing Sheets

ELECTRICAL SYSTEM FOR CONTROLLING THE OPERATION OF A HEAT EXCHANGER UNIT, THERMOSTAT THEREFOR AND METHODS OF MAKING THE SAME

BACKGROUND OF THE INVENTION

1. Field of the Invention

This invention relates to a new electrical system for controlling the operation of a heat exchanger means and to a new thermostat for such a system as well as to a new method of making such a system and a new method of making such a thermostat.

2. Prior Art Statement

It is well known to provide an electrical system for controlling the operation of a heat exchanger means, the system having a first electrical power source, the system having an electronic control logic unit operatively interconnected to the first power source to operate the heat exchanger means in relation to data means selectively entered into the electronic control logic unit and being maintained by the electronic control logic unit as long as the electronic control logic unit is receiving electrical power, the system having a second electrical power source for supplying electrical power to the electronic control logic unit to maintain the data means thereof when the first electrical power source ceases to supply electrical power to the electronic control logic unit even for a relatively long period of time, the second electrical power source comprising a battery, such as a rechargeable battery.

For example, see Perkins, et al, U.S. Pat. No. 3,948,441 for an example of a thermostat having a rechargeable battery as a back-up second electrical power source and while this patent does not disclose an electronic control logic unit, see the Hart, U.S. Pat. No. 5,102,042 for a disclosure of such an electronic control logic unit for a thermostat.

It is also well known that capacitors have been utilized for short-term electrical power back-up, such as to maintain operation for a few minutes while batteries are changed or to cover brief power outages of a few seconds or less. However, applicant is not aware of any use of capacitors as a possible replacement for a battery in an electronic thermostat.

SUMMARY OF THE INVENTION

It is a feature of this invention to provide a new thermostat for controlling the operation of a heat exchanger means that uniquely utilizes capacitor means as a back-up electrical power source for the electronic control logic unit of the thermostat when the main electrical power source for the thermostat ceases to supply electrical power to the electronic control logic unit even for a relatively long period of time whereby such capacitor means completely eliminates the need for a back-up battery arrangement.

In particular, it is well known that electronic thermostats require power to operate and to maintain their set point and time/temperature programs. Such thermostats derive this power from batteries or from AC power mains from the heating and/or cooling unit that the thermostat is controlling. However, the AC power is occasionally lost during storms, equipment malfunctions, repairs, etc. Accordingly, since a practical electronic thermostat must not forget the time, operating mode, or temperature it was controlling due to such AC power outages, the prior known electronic thermostats each utilized a battery for supplying back-up electrical power to the respective thermostat.

However, it also well known that batteries have many drawbacks. They are expensive and must be replaced on a regular basis. They can leak corrosive chemicals and cause equipment damage. Disposal of dead batteries is an environmental hazard. Extra circuitry is required to sense battery conditions in order to warn the user when replacement is needed and to protect in case the wrong batteries are used or they are installed incorrectly. Battery holders or special hand assembly techniques are required to mount the batteries to printed circuit boards. The battery is by far the least reliable part in an electronic thermostat. Rechargeable batteries last longer and do not normally need replacement during the life of the product. However, they have the other disadvantages mentioned above plus they are even more expensive. A rechargeable battery takes a significant amount of time and power to recharge and will only last for a finite number of charge/discharge cycles. A rechargeable battery has a failure rate that is very high if not kept charged, for example, in a thermostat that is unpowered during the summer months, or sits on a dealer's shelf for months before being sold.

In contrast, the energy storage capacitor means of this invention is utilized to eliminate such a battery and it functions like a rechargeable battery in that the capacitor means is charged when main electrical power is available and when the main electrical power fails, the capacitor means discharges to supply power to the electronic control logic unit of the thermostat.

It has been found according to the teachings of this invention that capacitors have many advantages compared to batteries. For example, a capacitor is more reliable and doesn't need replacement. A capacitor can be charged instantly and is not degraded by charge/discharge cycles or long period of storage. No low battery detection or indicator circuits are needed and a capacitor does not leak or impose environmental hazards. A capacitor can mount directly to a printed circuit board with standard automatic assembly equipment and is cheaper for a given physical size and comes in a much wider range of sizes. While a capacitor stores less energy per unit volume than a battery, advances in the state of the art have increased the performance of capacitors and have lowered the power requirements of the electronic circuitry whereby this makes long term operation with a capacitor practical.

Accordingly, one embodiment of this invention comprises an electrical system for controlling the operation of a heat exchanger means, the system having a first electrical power source, the system having an electronic control logic unit operatively interconnected to the first power source to operate the heat exchanger means in relation to data means selectively entered in the electronic control logic unit and being maintained by the electronic control logic unit as long as the electronic control logic unit is receiving electrical power, the system having a second electrical power source for supplying electrical power to the electronic control logic unit to maintain the data means thereof when the first electrical power source ceases to supply electrical power to the electronic control logic unit even for a relatively long period of time, the second electrical power source comprising capacitor means that is operatively interconnected to the electronic control logic unit and is operatively interconnected to the first electrical power source to store electrical energy from the first electrical power source in the capacitor means to be subsequently used as the second electrical power source when needed by the electronic control logic unit.

Accordingly, it is an object of this invention to provide a new electrical system for controlling the operation of a heat exchanger means, the system of this invention having one or more of the novel features of the invention as set forth above or hereinafter shown or described.

Another object of this invention is to provide a new method of making such an electrical system for controlling the operation of a heat exchanger means, the method of this invention having one or more of the novel features of this invention as set forth above or hereinafter shown or described.

Another object of this invention is to provide a new thermostat for controlling the operation of a heat exchanger means, the thermostat of this invention having one or more of the novel features of this invention as set forth above or hereinafter shown or described.

Another object of this invention is to provide a new method of making such a thermostat for controlling the operation of a heat exchanger means, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein.

DESCRIPTION OF THE PREFERRED EMBODIMENTS

Figure 1:
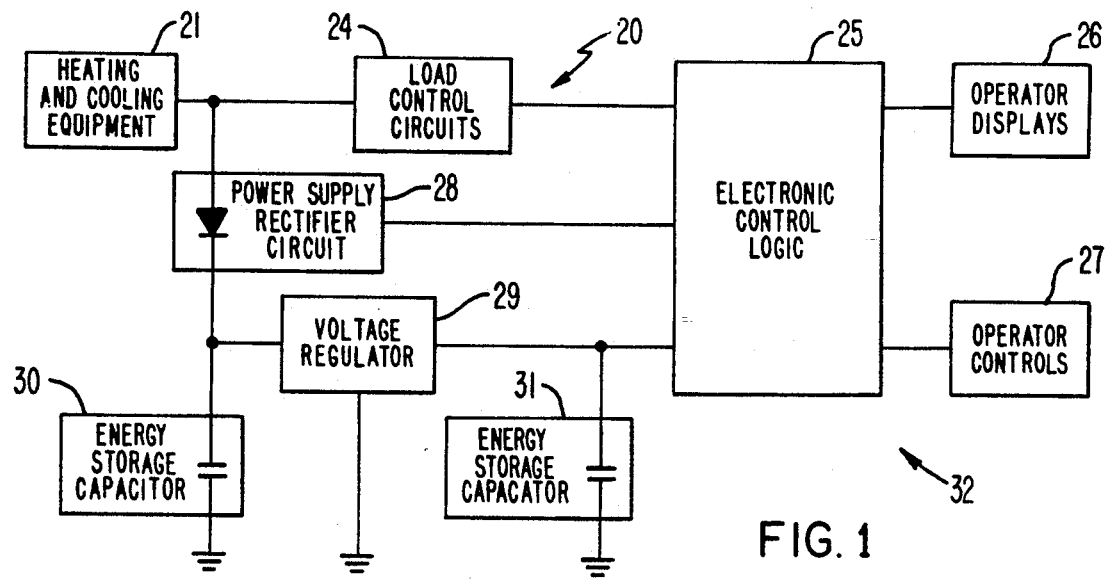
FIG. 1 is a block diagram illustrating the new system and the new thermostat of this invention for controlling the operation of a heat exchanger means.

While the various features of this invention are hereinafter illustrated and described as being particularly adapted to provide thermostatic means for controlling the operation of the heating unit and the cooling unit of a heat exchanger means, it is to be understood that the various features of this invention can be utilized singly or in various combinations thereof to provide control means for other types of heat exchanger means as desired.

Therefore, this invention is not to be limited to only the embodiments illustrated in the drawings, because the drawings are merely utilized to illustrate one of the wide variety of uses of this invention.

Referring now to FIG. 1, the new electrical system of this invention is generally indicated by the reference numeral 20 and is utilized for controlling the operation of a heat exchanger means 21 that comprises a heating unit 22, FIG. 2 and a cooling unit 23, FIG. 2, in a manner hereinafter set forth.

Figure 3:
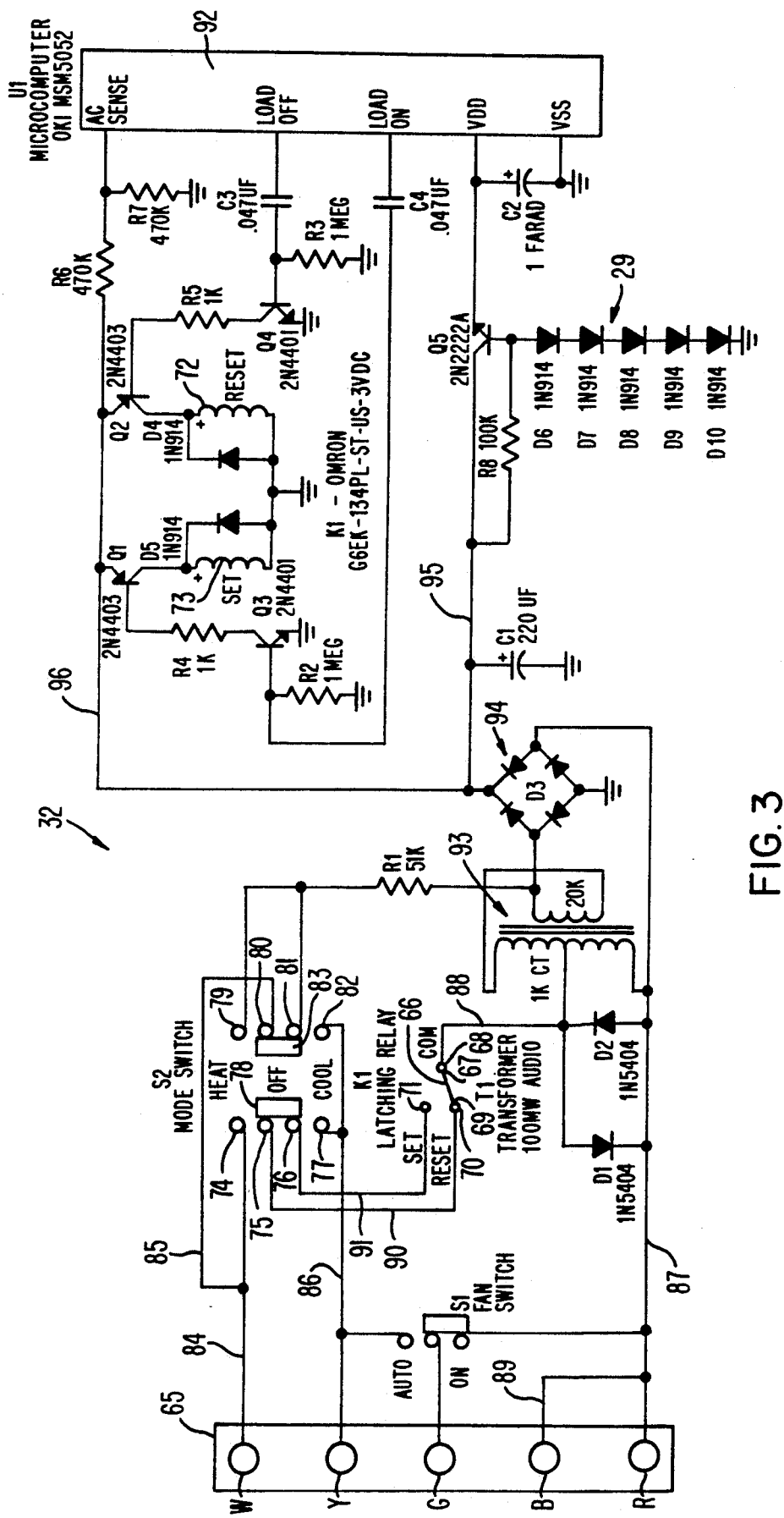
FIG. 3 illustrates the electrical circuit means of one new thermostat of this invention that is utilized in the control system of this invention that is illustrated in FIG. 1.

The remaining blocks 24-31 of FIG. 1 comprises the new thermostat of this invention that is generally indicated by the reference numeral 32 in FIG. 1 as well as in FIG. 3.

The heating and cooling equipment or heat exchange means 21 typically supplies 24 volts alternating current to operate the thermostat 32 which, in turn, routes the 24 vac to the various valves, relays, etc., required to operate the heating and cooling equipment or heating means 21.

Figure 2:
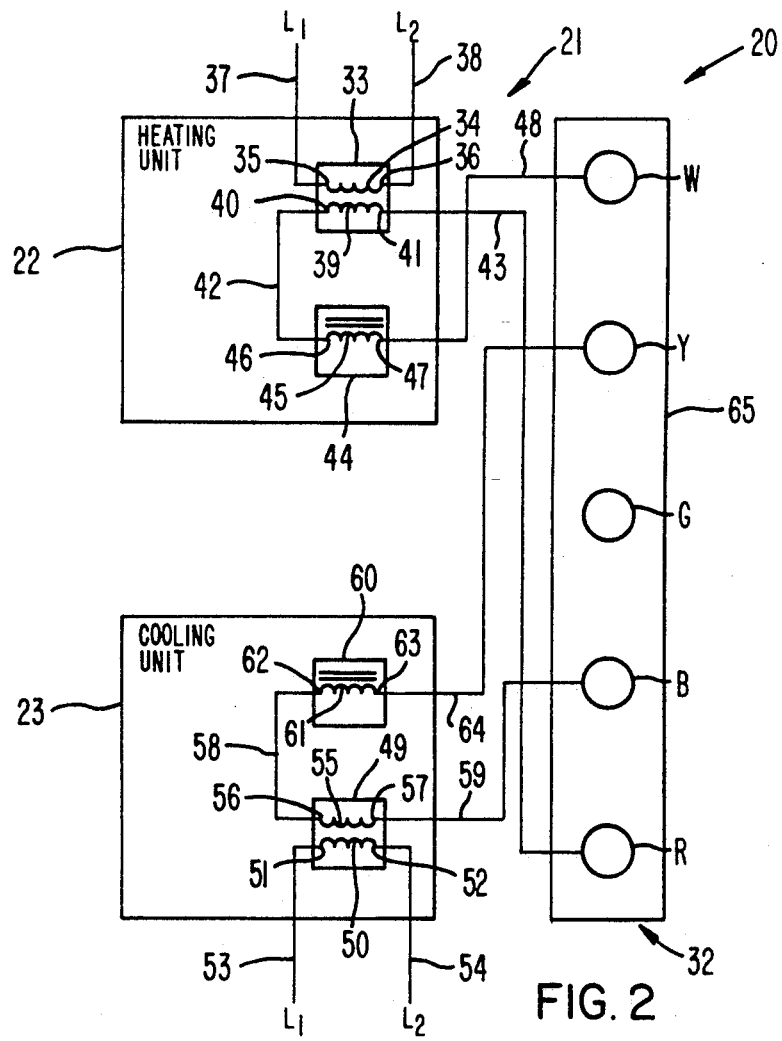
FIG. 2 is a schematic view illustrating how the heating unit and cooling unit of the system of FIG. 1 is electrically interconnected to terminal means of the new thermostat of this invention.

For example, it can be seen in FIG. 2 that the heating unit 22 comprises a transformer 33 having a primary coil 34 with opposed ends 35 and 36 being respectively interconnected by leads 37 and 38 to a high voltage alternating current source that is designated L1 and L2, the source L1 and L2 normally being a 110 volt alternating electrical current source.

The transformer 33 also comprises a secondary winding 39 having opposed ends 40 and 41 respectively interconnected to leads 42 and 43.

The heating unit 22 also has a relay unit 44 comprising a relay coil 45 having opposed ends 46 and 47 respectfully interconnected to the lead 42 and a lead 48, the relay unit 44 being adapted to turn on the heating unit 22 when a low voltage alternating current source passes through the coil 45 thereof as is well known in the art. Of course, the heating unit 22 is turned off when the flow of low voltage alternating current through the coil 45 of the relay unit 44 ceases.

Similarly, the cooling unit 23 has a transformer 49 comprising a primary coil 50 having opposed ends 51 and 52 respectfully interconnected to the high voltage power source L1, L2 by leads 53 and 54. The transformer 49 also comprises a secondary coil 55 having opposed ends 56 respectively interconnected to leads 58 and 64.

The cooling unit 23 has a relay unit 60 comprising a relay coil means 61 having opposed ends 62 and 63 respectfully interconnected to the lead 58 and a lead 64. Thus, the cooling unit 23 is turned on when a low voltage alternating current passes through the relay coil 61 and the operation of the cooling unit 23 is terminated when the flow of low voltage alternating current through the relay coil 61 ceases as is well known in the art.

The thermostat 32 illustrated in FIGS. 2 and 3 includes a terminal block 65 which has terminal posts or connections W, Y, G, B and R. As illustrated in FIG. 2, the lead 48 from the relay coil 45 of the heating unit 22 is interconnected to the terminal post means W while the lead 43 connected to the end 41 of the secondary winding 39 of the transformer 33 for the heating unit 22 is interconnected to the terminal post means R. The lead 59 of the secondary winding 55 of the transformer 49 of the cooling unit 23 is interconnected to the terminal post means B while the lead 64 of the relay coil 61 of the relay unit 60 of the cooling unit 23 is interconnected to the terminal post means Y.

Since the terminal post means G is utilized for the blower motor means for the heat exchanger means 21 and therefore does not form any part of this invention, such a blower motor means is not illustrated in FIG. 2 but is to be understood that such blower means can be provided, if desired.

The block 24 of the thermostat 32 illustrated in FIG. 1 comprises load control circuits and in the thermostat 32 of this invention comprises a latching relay designated K1 in FIG. 3 and having a movable relay switch arm or blade 66 that has one end 67 always interconnected to a common contact 68 while the other end 69 thereof is adapted to be moved between a "reset" contact 70 and a "set" contact 71. The latching relay K1 also comprises a relay coil 72 which when energized will move the relay contact 66 to the reset position illustrated in FIG. 3 so that the blade 66 is bridging the common contact 68 with the reset contact 70. The latching relay K1 also includes a relay coil 73 which when energized will move the relay contact 66 so that the end 69 thereof is against the set contact 71 for a purpose hereinafter set forth.

Of course, the load control circuits 24 includes the various diodes, transistors and capacitors as illustrated in FIG. 3 that are associated with such latching relay K1 and the values and designations thereof in one working embodiment of this invention are fully set forth in FIG. 3 so that a specific reference hereto is deemed unnecessary as the operation thereof in a thermostat construction are well known in the art.

The load control circuit means 24 also comprises a mode selector switch means that is designated S2 in FIG. 3 and a fan switch means that is designated S1 in FIG. 3.

The mode switch means S2 of the thermostat 32 comprises a first series of four contacts 74, 75, 76 and 77 and a movable contact member 78 that is adapted to bridge two of the contact 74-77 in any one of the three positions thereof, the three positions being an "OFF" position where the contacts 75 and 76 are bridged by the contact member 78, the "HEAT" position where the contacts 74 and 75 are bridged, by the contact member 78 and the "COOL" position where the contacts 76 and 77 are bridged by the contact member 78.

The mode switch means S2 also comprises a second set of four contact means 79, 80, 81 and 82 that are adapted to be controlled by a movable contact member 83 that is moved in unison with the contact member 78 so that the contact member 83 in the "OFF" position thereof bridges the contacts 80 and 81 as illustrated in FIG. 3, the contact member 83 when in the "HEAT" position thereof bridges the contacts 79 and 80 and the contact member 83 when in the "COOL" position bridges the contacts 81 and 82.

Thus, the operator of the thermostat 32 can set the mode switch means S2 in any one of three positions, namely "OFF", "HEAT" or "COOL".

Since the fan switch means S1 does not form any part of this invention, a further discussion of the fan switch means S1 is deemed unnecessary.

As illustrated in FIG. 3, the terminal post means W is interconnected by a line or lead means 84 to the contact 74 of the mode switch means S2 and by a branch line or lead means 85 to the contact 80 of the mode switch means S2. The terminal post means Y is interconnected by a line or lead means 86 to the contacts 77 and 82 of the mode switch means S2. The terminal post means R is interconnected by a line or lead means 87 and a diode D2 in a branch line or lead means 88 to the common terminal 68 of the latching relay K1. The terminal post B is interconnected to the lead 87 by a line or lead means 89. The reset contact 70 of the latching relay K1 is interconnected by a lead 90 to the contact 75 of the mode switch means S2 while the set contact 71 of the latching relay K1 is interconnected by a lead 91 to the contact 76 of the mode switch means S2.

Thus, it can be seen from FIGS. 2 and 3 that when the mode switch means S2 is set in the "COOL" condition thereof and the power source L1 and L2 is operating, the cooling unit 23 will have the relay coil means 61 thereof energized to turn on the cooling unit 23 when the set coil 73 of the latching relay is energized to move the switch blade 66 against the set contact 71 and will not have current flowing through the coil 61 when the relay blade 66 is moved to its reset position against the reset contact 70 as illustrated in FIG. 3 by current having been sent through the reset coil 72 whereby the cooling unit 23 will be turned off, the thermostat 32 moving the blade 66 in such a manner to turn on the cooling unit 23 when the temperature sensing means (not shown) of the thermostat 32 senses a temperature above a set temperature thereof and to turn off the cooling unit 23 when sensing a temperature below the set temperature all in a manner well known in the art.

Conversely, when the mode switch means S2 is set in the "HEAT" position thereof, the relay coil 45 of the heating unit 22 will have current flowing through the same so as to turn on the heating unit 22 when the relay switch blade 66 is disposed against the reset contact 70 by having the reset coil 72 energized and will turn off the heating unit 22 when the switch blade 66 is moved against the set contact 71 by the set coil 73 having been energized, the thermostat 32 so moving the relay blade 66 to turn on the heating unit 22 when the sensed temperature is below the set temperature of the thermostat 32 and turning off the heating unit 22 when the sensed temperature is above the set temperature all in a manner well known in the art.

The thermostat 32 comprises an electronic control logic unit 25 that is illustrated in FIG. 1 and comprises a microcomputer 92 which is also designated U1 in FIG. 3, the microcomputer 92 performing the necessary temperature sensing, timing, and control operations that are well known in the art.

The microcomputer 92 is adapted to operate the operator displays 26 of FIG. 1 and is adapted to receive data means from an operator controls 27 of FIG. 1, the operator controls 27 allowing the user of the thermostat 32 to adjust and monitor thermostat operations with the operator controls 27 typically including keyboards, knobs and switches. The operator displays 26 would typically use light emitting diodes, a liquid crystal display or a vacuum fluorescent display as well known in the art.

In this manner, it can be seen that the microcomputer 92 can be utilized to provide selected programs of operation of the system 20, such as turning on and off the heating unit 22 at various times of the day or night at different set temperatures when the selector switch means S2 is set in the heating mode thereof and to turn on and off the cooling unit 23 at various times of the day or night at different set temperatures when the selector mode switch S2 is set in the cooling mode thereof.

Such time and temperature data means is entered into the microcomputer 92 by the operator through the use of the operator controls 27 in a manner well known in the art to be stored in the microcomputer 92 to be utilized at the appropriate times of the day as determined by the operating clock means (not shown) of the microcomputer 92.

The thermostat 32 comprises a power supply rectifier circuit 28, FIG. 1 that converts the 24 VAC supplied by the heating and cooling equipment for heat exchanger means 21 into low voltage DC which powers the electronics of the thermostat 32, the power rectifier circuit comprising a transformer means that is generally indicated by the reference numeral 93 in FIG. 3 and a bridge means that is generally indicated by the reference numeral 94 in FIG. 3. Thus the circuit means of the thermostat 32 to the right of the bridge means 94 in FIG. 3 is supplied low voltage DC current in a manner similar to the bridge circuit set forth in the aforementioned Hart, U.S. Pat. No. 5,102,042, whereby this U.S. patent is being incorporated into this disclosure by this reference thereto.

Thus, it can be seen that the rectifier means 94 will supply low voltage direct current to the microcomputer 92 through line or lead means 95 that is interconnected to the port VDD of the microcomputer 92 which will utilize such current to maintain the data means that has been entered into the microcomputer 92 by the operator control means 27 so as to operate the relay coils 72 and 73 in relation to the sensed temperature through the temperature sensing means in relation to time and programs set in the microcomputer 92 in a manner well known in the art.

For example, the microcomputer 92 will operate the set coil means 73 by a signal being sent out of the port "LOAD ON" thereof and will control the reset coil means 72 by sending a signal out of the port "LOAD OFF" thereof in a manner well known in the art. Also, the microcomputer 92 will sense the operation of the rectifier means 94 through a line or lead means 96 that is interconnected to the port "AC SENSE" thereof.

Therefore, as long as the main AC power source L1, L2 is in effect supplying low voltage AC current to the lines 84 and 86 for operating the transformer 93 and the rectifier means 94, the microcomputer 92 or electronic control logic unit 25 will have electrical power supplied thereto so as to maintain the data means that has been entered into the microcomputer 92 and to operate the heatexchange means 21 in a manner previously described in relation to such data means and in relation to time and temperature.

However, the thermostat 32 of the system 20 of this invention provides a unique second power source for supplying back-up electrical power to the electronic control logic unit 25 should that first electrical power source L1,L2 cease to operate even for a relatively long period of time.

In particular, the second electrical power source of this invention comprises one or more energy storage capacitors that are represented by the blocks 30 and 31 of FIG. 1 and may comprise a voltage regulator 29 in combination therewith, if desired.

The energy storage capacitor 30 comprises a capacitor C1 in FIG. 3 that is charged by the power supply rectifier circuit 28 when AC power is available in the system 20 from the first power source L1, L2 and when that first AC power source L1, L2 is removed, the capacitor C1 maintaines voltage to the regulator 29 which comprises a transistor Q5, diodes D6, D7, D8, D9 and D10 and resistor R8 arranged in the manner illustrated in FIG. 3 so as to provide voltage at the input port VDD of the microcomputer 92.

The energy storage capacitor 31 comprises a capacitor C2 in FIG. 3 which is an alternate energy storage capacitor and it functions like capacitor C1 but the voltage it supplies to the control logic unit 25 is not regulated by the regulator 29.

It is believed that only capacitor C1 or capacitor C2 must be a large energy storage capacitor and if the electronic control logic unit 25 does not require a regulated supply voltage, then the energy storage capacitor can be disposed at the location of C2 in FIG. 3 and as the voltage of the capacitor C2 falls, the control logic unit 25 will draw less current. This location of capacitor C2 also eliminates the voltage drop and inefficiency of the voltage regulator 29 whereby these factors reduce the energy drain on the capacitor C2 and increases the back-up time of operation provided by the capacitor C2.

In the one working embodiment of the thermostat 32 illustrated in FIG. 3, the power supply rectifier means 28 uses the transformer 93 and bridge rectifier 94 to charge the capacitor C1 to approximately 5 VDC when AC power is available from the first power source L1, L2 being provided by lines 84 and 87. The voltage regulator 29 reduces the power stored in the capacitor C1 to approximately 1.6 VDC to operate the electronic control logic unit 25 and charge the capacitor C2. Thus, when the first AC power source is removed so that no current flows in lines 84 and 87, the electronic control logic unit 25 continues to operate until the voltage on capacitor C2 drops below approximately 1.0 VDC and it takes approximately eight hours for the microcomputer 92 to drop the voltage in the capacitor C2 to below approximately 1.0 VDC.

If the capacitor C1 is utilized, the same can store enough energy to operate the latching relay means K1 once. Thus, when the first AC power source L1, L2 fails, the microcomputer 92 can switch off the operating relay to prevent compressor damage in case the power failure was for less than a few minutes.

It has been found that capacitors up to one farad are economically available and that microcomputers can operate on as little as five micro amperes. Such parts can provide operating time in excess of 200 hours.

The microcomputer 92 can be programmed to save power while running on the capacitor C2 so that the heating and cooling system 20 can not operate without power so that the microcomputer 92 need not attempt to switch the system on and off.

Also, the microcomputer 92 can be programmed so that the control panel, keyboard, input controls, display and temperature measuring circuitry will also be deactivated by the microcomputer 92 when operating on the second power source provided by the capacitor C2. This can reduce power consumption by 10:1 or more whereby the only function that must remain active for the microcomputer 92 is the real time clock so that the thermostat 32 does not loose track of the correct time and day.

Due to the low power nature of such a thermostat 32 of this invention, power to charge the capacitor C2 can be obtained from sources other than AC power line. For example, solar cells can convert ambient light into electricity to charge the capacitor C2 and such a design would not be practical with batteries. Solar cells that would fit on a thermostat could not generate enough energy to charge a battery and the daily charge/discharge cycle would soon wear out the battery.

Figure 4:
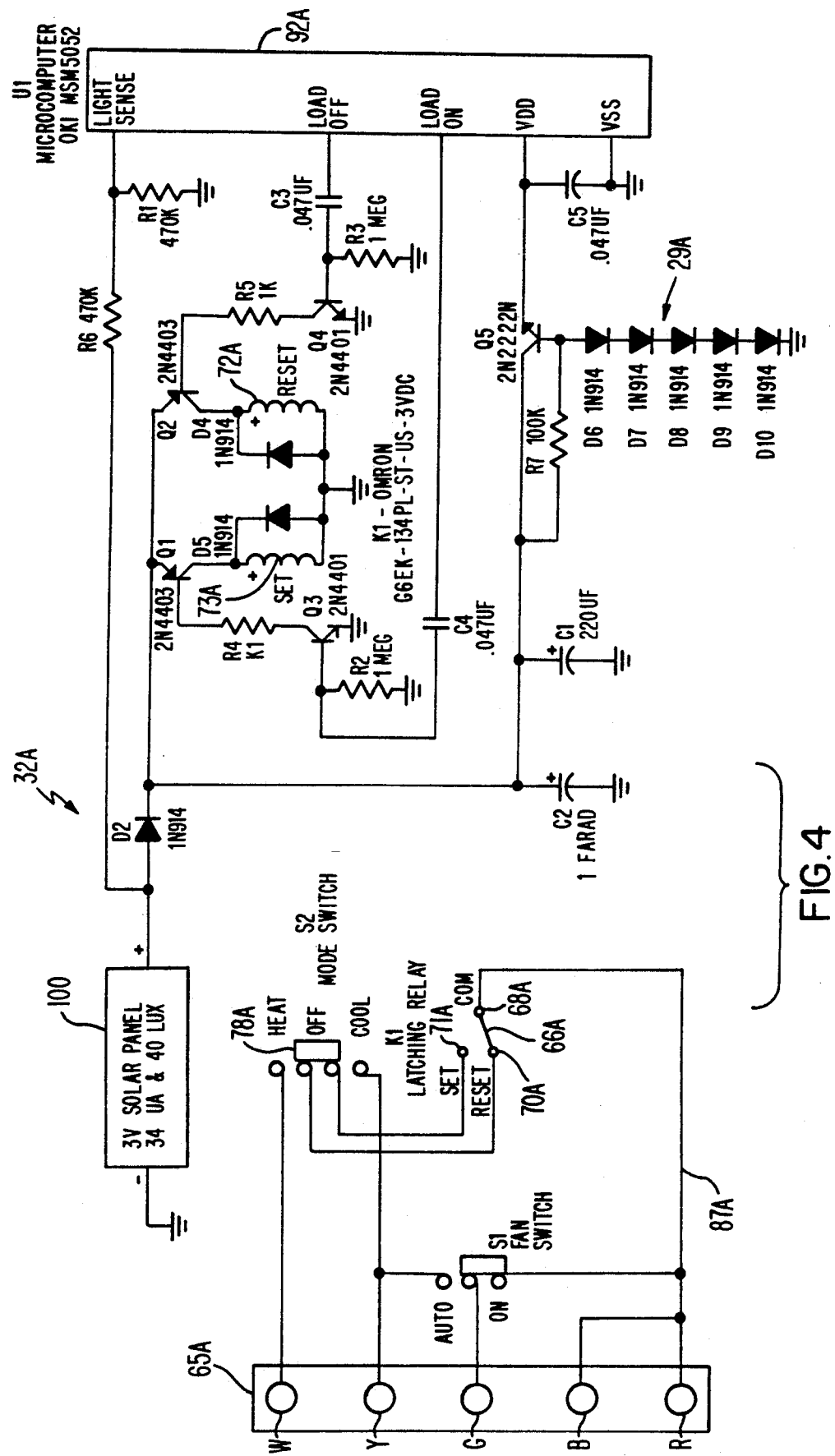
FIG. 4 is a view similar to FIG. 3 and illustrates another new thermostat of this invention wherein solar energy comprises the main electrical power source for the thermostat.

Therefore, reference is now made to FIG. 4 wherein another thermostat of this invention is generally indicated by the reference numeral 32A and parts thereof similar to the parts of the thermostat 32 are indicated by like reference numerals followed by the reference "A".

As illustrated in FIG. 4, the thermostat 32A is substantially identical to the thermostat 32 previously described except that the power supply rectifier circuit 28 is not utilized and that a solar panel 100 is utilized to supply power to the microcomputer 92A, relay coils 72A, 73A and capacitors C1, C2.

It can be seen that in the thermostat 32A the capacitors C1 and C2 are both in advance of the voltage regulator 29A and that an additional capacitor C5 is utilized for noise filtering purposes.

Thus, both thermostats 32 and 32A of this invention operate in a like manner in that when the first power source, such as provided by lines 84 and 87 of the thermostat 32 and the solar panel 100 of the thermostat 32A, ceases to exist, the energy that has been stored in the capacitor means C1, C2 is utilized for operating the microcomputer 92 or 92A in the manner previously set forth so that the microcomputer 92 or 92A will not lose the data means that has been stored therein for proper operation of the thermostat 32 and 32A once the regular power has been restored thereto.

Therefore, it can be seen that one embodiment of this invention provides an electrical system 20 for controlling the operation of a heat exchanger means 21, the system 20 having a first electrical power source L1, L2, the system 20 having an electronic control logic unit 25 operatively interconnected to the first power source L1, L2 to operate the heat exchanger means 21 in relation to data means selectively entered into the electronic control logic unit 25 by the operator controls 27 and being maintained by the electronic control logic unit 25 as long as the electronic control logic unit 25 is receiving electrical power, the system 20 having a second electrical power source 30 or 30, 31 for supplying electrical power to the electronic control logic unit 25 to maintain the data means thereof when the first electrical power source L1, L2 ceases to supply electrical power to the electronic control logic unit 25 even for a relatively long period of time, the second electrical power source 30 or 30, 31 comprising capacitor means C1 or C2 or C1 and C2 that is operatively interconnected to the electronic control logic unit 25 and that is operatively interconnected to the first electrical power source L1, L2 to store electrical energy from the first electrical power source L1, L2 in the capacitor means C1 or C2 or C1 and C2 to be subsequently used as the second electrical power source when needed by the electronic control logic unit 25.

Therefore, this invention not only provides a new electrical system for controlling the operation of a heat exchanger means and a new thermostat for such a system, but also this invention provides new methods of making such an electrical system and such a thermostat.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an electrical system for controlling the operation of a heat exchanger means, said system having a first electrical power source, said system having an electronic control logic unit operatively interconnected to said first power source to operate said heat exchanger means in relation to data means selectively entered into said electronic control logic unit and being maintained by said electronic control logic unit as long as said electronic control logic unit is receiving electrical power, said system having load control circuit means operatively interconnected to said heat exchanger means and said control logic unit and having relay coil means to operate said heat exchanger means when in one condition thereof and to turn off said heat exchanger means when in another condition thereof, said system having a second electrical power source for supplying electrical power to said electronic control logic unit to maintain said data means thereof when said first electrical power source ceases to supply electrical power to said electronic control logic unit even for a relatively long period of time, said second electrical power source comprising capacitor means that is operatively interconnected to said electronic control logic unit and that is operatively interconnected to said first electrical power source to store electrical energy from said first electrical power source in said capacitor means to be subsequently used as said second electrical power source when needed by said electronic control logic unit, the improvement wherein said capacitor means comprises a first capacitor that stores sufficient electrical energy to operate said relay coil means one time after said first electrical power source ceases to supply electrical power to said system to operate said coil means and a second capacitor that stores sufficient electrical energy to operate said electronic control logic unit even for said relatively long period of time.

2. A system as set forth in claim 1 wherein said first power source comprises an alternating current source that is also adapted to be operatively interconnected to said heat exchanger means to operate the same.

3. A system as set forth in claim 1 wherein said first power source comprises a solar energy panel means.

4. A system as set forth in claim 1 wherein said system has a voltage regulator means operatively interconnecting said first capacitor to said electronic control logic unit.

5. A system as set forth in claim 1 and comprising a voltage regulator means disposed between said first capacitor and said second capacitor whereby said voltage regulator means regulates the voltage of the stored energy of said first capacitor being fed therefrom to said electronic control logic unit.

* * * * *